(12) United States Patent
Johnson

(10) Patent No.: US 7,391,478 B2
(45) Date of Patent: *Jun. 24, 2008

(54) METHOD AND SYSTEM FOR 3D COMB FILTERING OF A VIDEO SIGNAL

(75) Inventor: Shawn V. Johnson, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 606 days.

This patent is subject to a terminal disclaimer.

(21) Appl. No.: 10/943,267

(22) Filed: Sep. 17, 2004

(65) Prior Publication Data

US 2005/0168646 A1    Aug. 4, 2005

Related U.S. Application Data

(60) Provisional application No. 60/540,698, filed on Jan. 30, 2004.

(51) Int. Cl.
*H04N 9/78* (2006.01)
(52) U.S. Cl. .................... 348/667; 348/665
(58) Field of Classification Search ......... 348/663–670; H04N 9/78
See application file for complete search history.

(56) References Cited

U.S. PATENT DOCUMENTS

| 4,974,065 | A | * | 11/1990 | Murakami et al. | .......... 348/668 |
| 5,523,850 | A | * | 6/1996 | Kanda et al. | .................. 386/25 |
| 6,300,985 | B1 | * | 10/2001 | Lowe et al. | ................. 348/665 |

* cited by examiner

*Primary Examiner*—M. Lee
(74) *Attorney, Agent, or Firm*—McAndrews, Held & Malloy, Ltd.

(57) ABSTRACT

Methods and systems for 3D comb filtering of a video signal are provided. Aspects of the method may include generating a plurality of interpolated pixels for corresponding video samples for a first video frame, determining at least one direction of least bandwidth among the video samples and the interpolated pixels, and blending combing according to the determined direction of least bandwidth. A plurality of interpolated pixels for corresponding video samples may be generated in a first pixel line of the first video frame. The plurality of interpolated pixels in the first pixel line may be generated, so that each of the plurality of interpolated pixels in the first pixel line is one quarter cycle phase-shifted from a corresponding adjacent pixel in the first pixel line.

40 Claims, 15 Drawing Sheets

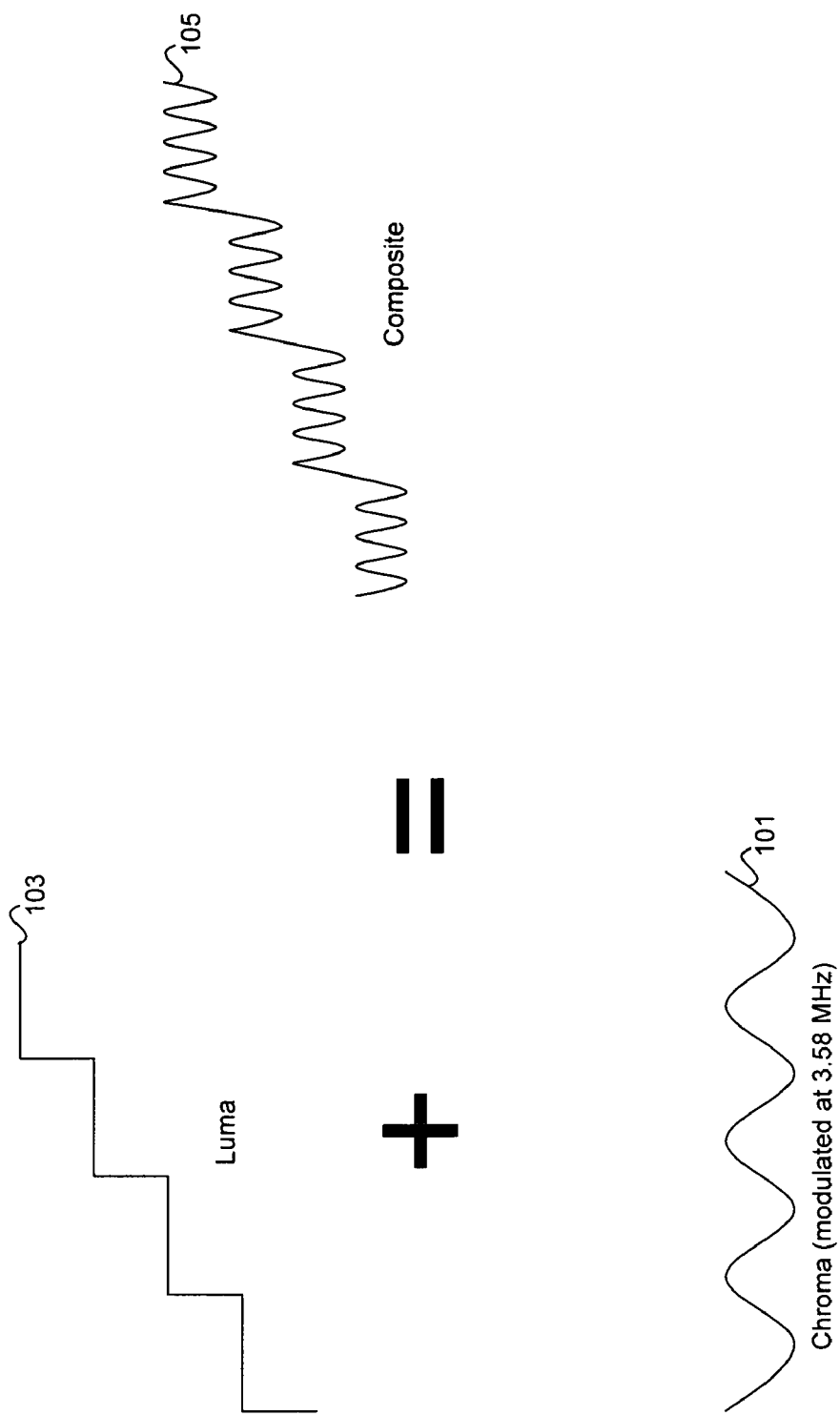

METHOD AND SYSTEM FOR 3D COMB FILTERING OF A VIDEO SIGNAL

CROSS-REFERENCE TO RELATED APPLICATIONS/INCORPORATION BY REFERENCE

This application makes reference to, claims priority to, and claims the benefit of U.S. Provisional Application Ser. No. 60/540,698, filed Jan. 30, 2004 and entitled "3D Comb Filter."

This application makes reference to:
U.S. application Ser. No. 10/943,587 filed Sep. 17, 2004;
U.S. application Ser. No. 10/943,593 filed Sep. 17, 2004;
U.S. application Ser. No. 10/943,596 filed Sep. 17, 2004;
U.S. application Ser. No. 10/869,395 filed Jun. 16, 2004; and
U.S. application Ser. No. 10/943,641 filed Sep. 17, 2004.

The above stated applications are hereby incorporated herein by reference in their entirety.

FIELD OF THE INVENTION

Certain embodiments of the invention relate to processing of video signals. More specifically, certain embodiments of the invention relate to a method and system for 3D comb filtering of a video signal.

BACKGROUND OF THE INVENTION

A composite video signal is the sum of a luminance (brightness) signal and a chrominance (color) signal. These signals may be referred to as luma and chroma signals, respectively. The frequency ranges of the luma and chroma signals are designed to overlap. In video processing, the luma and chroma signal components are added together in order to generate a composite video signal. The luma and chroma video elements are integrated and broadcasted as a single composite video stream. Once the broadcasted composite signal is received, the luma and chroma signal components must be separated in order for the video signal to be processed and displayed. A comb filter may be utilized for separating the chroma and luma video signal components. For example, a television may be adapted to receive a composite video input and utilize an integrated comb filter to separate the chroma and luma video signal components. However, before the television can display the received video signal, the chroma and luma video components have to be separated.

FIG. 1 is a diagram illustrating generation of a conventional composite video signal. Referring to FIG. 1, a conventional composite video signal 105 may be generated from a luma component 103 and a chroma component 101. The composite video signal 105 may be generated by adding the chroma video signal component 101 and the luma video signal component 103. The chroma signal component 101 may be modulated at 3.58 megahertz and it may or may not comprise a constant chroma across the entire line. The luma signal component 103 may increase in amplitude in a stair step fashion or it may not.

FIG. 2A is a diagram illustrating modulated chroma signals in contiguous composite video frames. The chroma component may be modulated so that a frequency of each successive line of video may be phase-shifted by 180 degrees with respect to the previous line. Referring to FIG. 2A, the previous frame 201 may comprise a previous line 203, a current line 205, and a next line 207. Similarly, the current frame 209 may comprise a previous line 211, a current line 213, and a next line 215. The current line 213 in the current frame 209 may be phase-shifted by 180 degrees from the previous line 211 in the current frame 209, as well as from the next line 215 in the current frame 209. Similarly, the current line 205 in the previous frame 201 may be phase-shifted by 180 degrees from the previous line 203 in the previous frame 201, as well as from the next line 207 in the previous frame 201. In addition, since frames in the contiguous composite video signal are at a frequency rate of 59.94 Hz, there may be a 180-degree phase shift between two adjacent frames, for example, the current frame 209 and the previous frame 201. Correspondingly, the current line 213 in the current frame may be 180 degrees phase-shifted from the current line 205 in the previous frame 201.

In conventional video processing, there are three ways to separate the luma and chroma video components and these include combing horizontally, combing vertically, and combing temporally. During separation of the luma and chroma components, there are three bandwidth directions that may incur losses in the separation process and in the separated signal. Depending on the combing method that is utilized, the separated signal may have reduced vertical bandwidth, horizontal bandwidth, and/or temporal bandwidth.

The first way to separate the luma and chroma video components is by horizontal combing. Horizontal combing may be accomplished by utilizing a notch filter, for example. Since the chroma signal component in a composite video signal may be modulated at 3.58 MHz, a notch filter set at 3.58 MHz may be utilized. Combing vertically may also be utilized to separate the luma and chroma video components. Combing vertically may be achieved in three different ways—the current line may be combed with the previous and the next line, the current line may be combed with the line just before it, or the current line may be combed with the line just after it. The vertical combing is performed spatially, which involves combing only within one field at a time and without any temporal combing.

During combing in the current frame 209, for example, if the current line 213 is added to the previous line 211, the chroma content may cancel out and two times the luma content may be obtained. On the other hand, if the previous line 211 is subtracted from the current line 213, the luma content may cancel out and two times the chroma content may be obtained. In this way, luma and chroma content may be separated from the composite video signal for further processing. However, vertical combing may result in a reduced vertical bandwidth.

A third way to comb a composite signal is to comb temporally. Combing temporally comprises combing between two adjacent frames, for example, the current frame 209 and the previous frame 201. Further, temporal combing may be characterized by a reduced temporal bandwidth. Luma and chroma content may be separated by utilizing the same addition and subtraction method between a current line and a previous line as it was utilized with vertical combing.

FIG. 2B is a diagram illustrating combing of a correlated current line 224 and a previous line 222 in a current frame 220. In this case, there is no vertical bandwidth and the previous line 222 and the current line 224 are perfectly correlated. The current line 224 may be added with the previous line 222 and two times luma may be obtained. Similarly, the previous line 222 may be subtracted from the current line 224 so that two times chroma may be obtained.

FIG. 2C is a diagram illustrating combing of a non-correlated current line 234 and a previous line 232 in a current frame 230. In this case, there may be significant vertical bandwidth. The vertical bandwidth may be high enough so that there may be no correlation between the current line 234 and the previous line 232. When the current line 234 and the previous line 232 are combed together, there may be significant error in both the luma and chroma. This may produce combing artifacts in the obtained combed video signal. A substantially the same result may be obtained when combing temporally when there is temporal bandwidth, which indicates motion. Higher bandwidth in a given direction may cause combing in that direction to result in more incorrectly separated luma and chroma.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain aspects of the invention may be found in a method and system for 3D comb filtering of a video signal. More specifically, certain aspects of the invention may be found in a method for separating luma and chroma components in a composite video signal. The method may comprise generating a plurality of interpolated pixels for corresponding video samples for a first video frame. At least one direction of least bandwidth may be determined among the video samples and the interpolated pixels, and blending combing may be done according to the determined direction of least bandwidth. A plurality of interpolated pixels for corresponding video samples may be generated in a first pixel line of the first video frame. The plurality of interpolated pixels in the first pixel line may be generated, so that each of the plurality of interpolated pixels in the first pixel line is one quarter cycle phase-shifted from a corresponding adjacent pixel in the first pixel line. If the determined direction of least bandwidth is among in-phase pixels in the first pixel line, the video signal may be combed horizontally.

A plurality of interpolated pixels for corresponding video samples may be generated in a second pixel line of the first video frame, so that each of the plurality of interpolated pixels in the second line is one half cycle phase-shifted from a corresponding pixel in the first pixel line. If the determined direction of least bandwidth is among corresponding in-phase pixels in the first pixel line and in the second pixel line, the video signal may be combed vertically. If the determined direction of least bandwidth is among corresponding one-half cycle phase-shifted video samples in the first pixel line and in the second pixel line for a luma-only video signal, the video signal may be combed vertically. A plurality of interpolated pixels for corresponding video samples may be generated in a first pixel line of a second video frame, so that each of the plurality of interpolated pixels in the first pixel line of the second video frame is one half cycle phase-shifted from a corresponding pixel in the first pixel line of the first video frame.

If the determined direction of least bandwidth is among corresponding in-phase pixels in the first pixel line of the first video frame and in the first pixel line of the second video frame, the video signal may be combed temporally. If the determined direction of least bandwidth is among corresponding one-half cycle phase-shifted video samples in the first pixel line of the first video frame and in the first pixel line of the second video frame for a luma-only video signal, the video signal may be combed temporally. The video signal may be combed in a horizontal direction and in a vertical direction for the first video frame. The combing in the horizontal direction and the vertical direction may be blended with combing in a temporal direction for the first video frame.

Another aspect of the invention may provide a machine-readable storage, having stored thereon, a computer program having at least one code section executable by a machine, thereby causing the machine to perform the steps as described above for separating luma and chroma components in a composite video signal.

The system for separating luma and chroma components in a composite video signal may include at least one processor for generating a plurality of interpolated pixels for corresponding video samples for a first video frame. The at least one processor may determine a direction of least bandwidth among the video samples and the interpolated pixels, and may blend combing according to the determined direction of least bandwidth. The processor may generate a plurality of interpolated pixels for corresponding video samples in a first pixel line of the first video frame. The processor may generate the plurality of interpolated pixels in the first pixel line, so that each of the plurality of interpolated pixels in the first pixel line is one quarter cycle phase-shifted with respect to a corresponding adjacent pixel in the first pixel line.

The processor may comb horizontally, if the determined direction of least bandwidth is among in-phase pixels in the first pixel line. The processor may also generate a plurality of interpolated pixels for corresponding video samples in a second pixel line of the first video frame, so that each of the plurality of interpolated pixels in the second line is one half cycle phase-shifted with respect to a corresponding pixel in the first pixel line. If the determined direction of least bandwidth is among corresponding in-phase pixels in the first pixel line and in the second pixel line, the processor may comb vertically. If the determined direction of least bandwidth is among corresponding one-half cycle phase-shifted video samples in the first pixel line and in the second pixel line for a luma-only video signal, the at least one processor may comb vertically. The processor may generate a plurality of interpolated pixels for corresponding video samples in a first pixel line of a second video frame, so that each of the plurality of interpolated pixels in the first pixel line of the second video frame is one half cycle phase-shifted with respect to a corresponding pixel in the first pixel line of the first video frame.

The processor may be adapted to comb temporally, if the determined direction of least bandwidth is among corresponding in-phase pixels in the first pixel line of the first video frame and in the first pixel line of the second video frame. If the determined direction of least bandwidth is among corresponding one-half cycle phase-shifted video samples in the first pixel line of the first video frame and in the first pixel line of the second video frame for a luma-only video signal, the at least one processor may comb temporally. The processor may comb in a horizontal direction and a vertical direction for the first video frame. The processor may blend the combing in the horizontal direction and in the vertical direction, and combing in a temporal direction for the first video frame in order to maximize output video quality and minimize or eliminate artifacts.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1 is a diagram illustrating generation of a conventional composite video signal.

DETAILED DESCRIPTION OF THE INVENTION

Certain aspects of the invention may be found in a method and system for separating luma and chroma components in a composite video signal. Video samples, or true pixels, as well as a plurality of interpolated pixels for corresponding video samples, may be generated for a specific first video frame and a second video frame. A direction of least bandwidth may be determined among the video samples and the interpolated pixels within a pixel line, between pixel lines in the same video frame, and between pixel lines in two adjacent video frames. Horizontal, vertical and/or temporal combing may then be utilized in the determined direction of least bandwidth.

Certain other aspects of the invention may be found in a method and system for 3D comb filtering of a video signal. During separation of the chroma and luma video components in a composite video signal feed, combing horizontally, combing vertically and/or combing temporally may be utilized to achieve the chroma and luma separation. Since each of the three methods is associated with horizontal bandwidth losses, vertical bandwidth losses, and temporal bandwidth losses, respectively, a hybrid method may be applied where all three methods are utilized so that bandwidth losses may be reduced to the maximum degree. A 3D comb filter may be adapted to utilize a plurality of methods for signal separation. For example, the 3D comb filter may be adapted to comb horizontally, vertically and/or temporally, allowing for the chroma and the luma video components to be separated with minimum bandwidth losses.

Figure 2A:
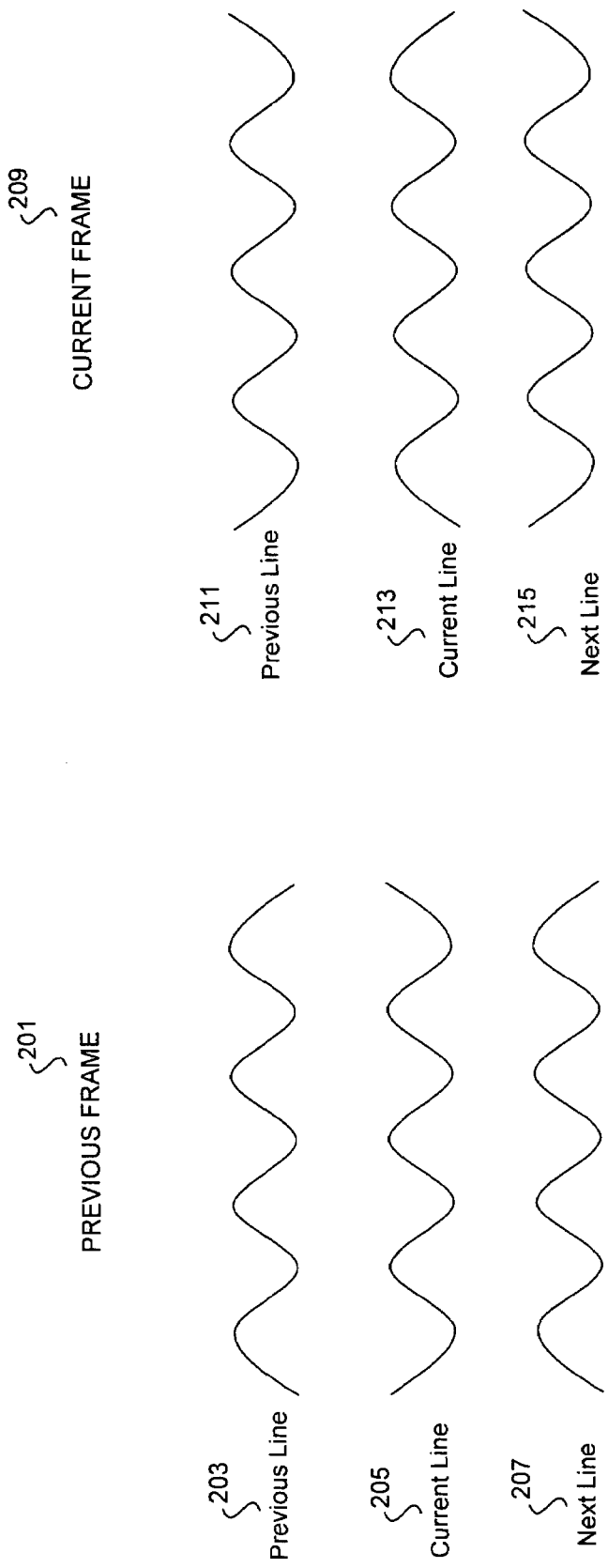
FIG. 2A is a diagram illustrating modulated chroma signals in contiguous composite video frames.
Figure 2B:
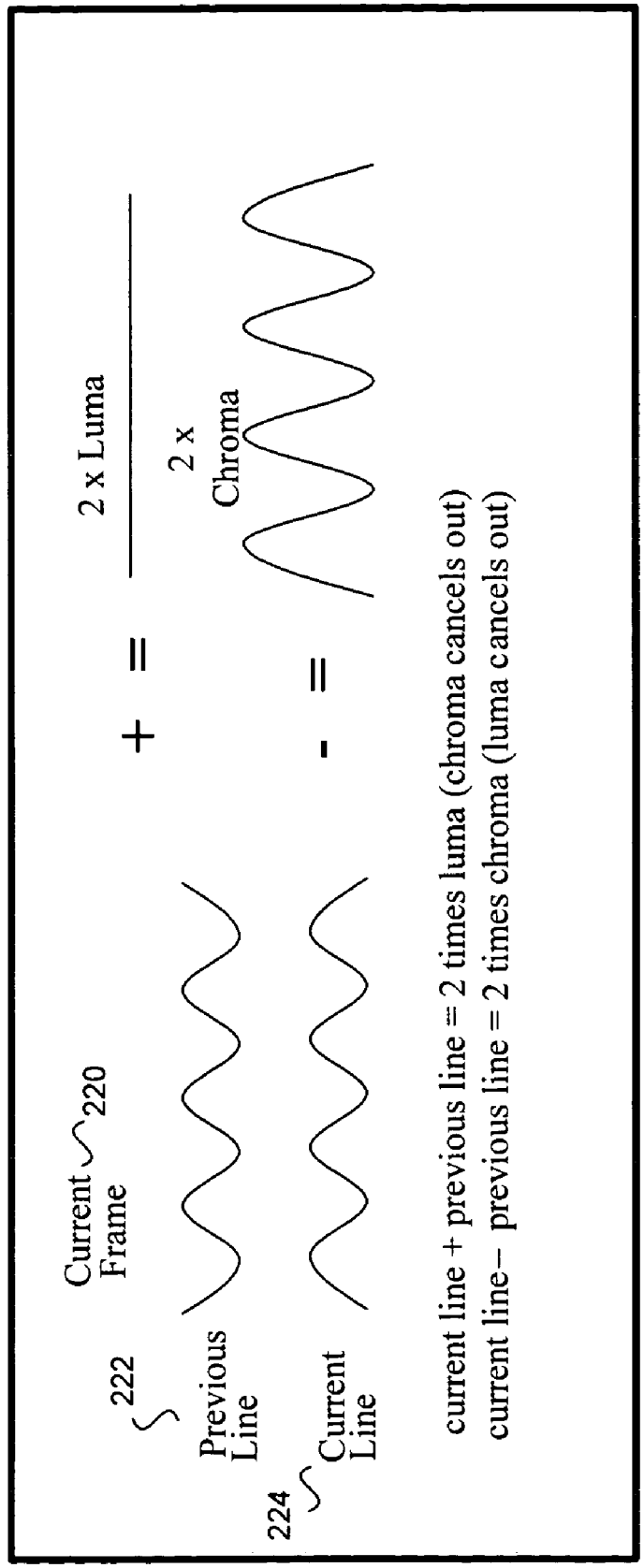
FIG. 2B is a diagram illustrating combing of a correlated current line and a previous line in a current frame.
Figure 2C:
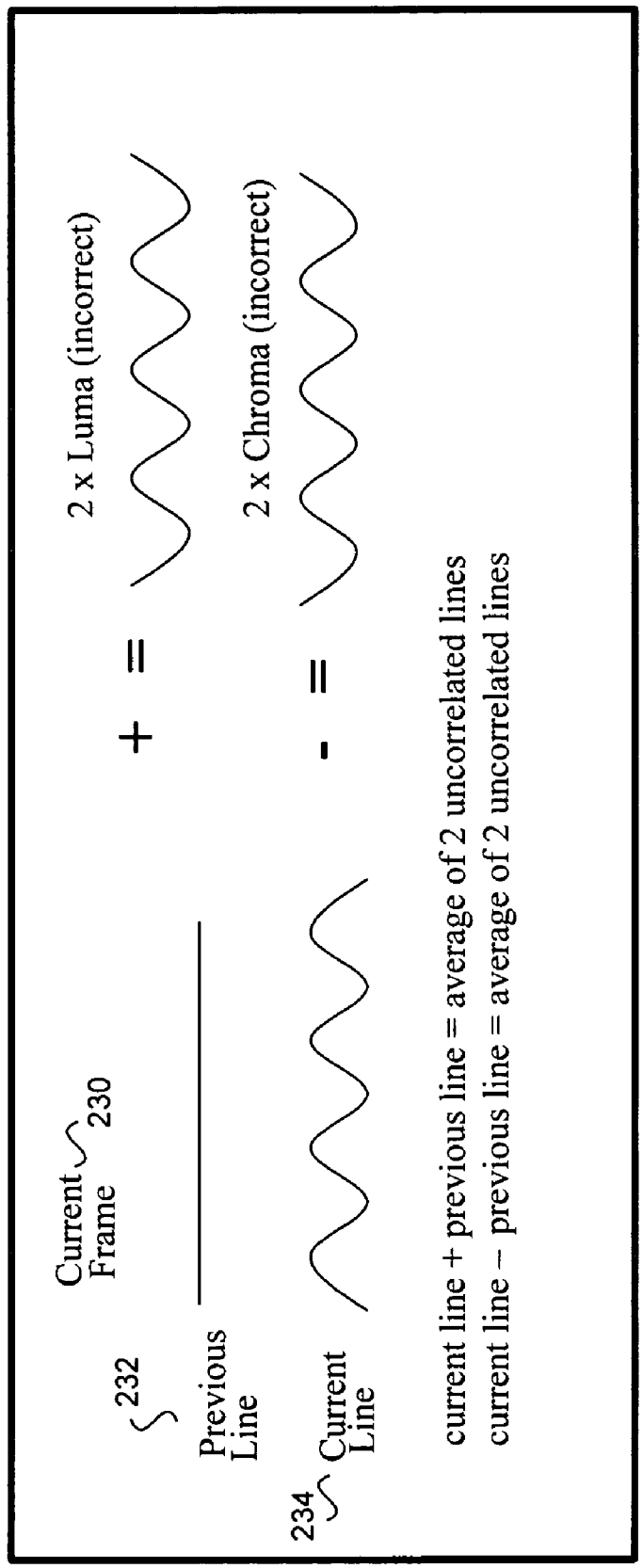
FIG. 2C is a diagram illustrating combing of a non-correlated current line and a previous line in a current frame.
Figure 3A:
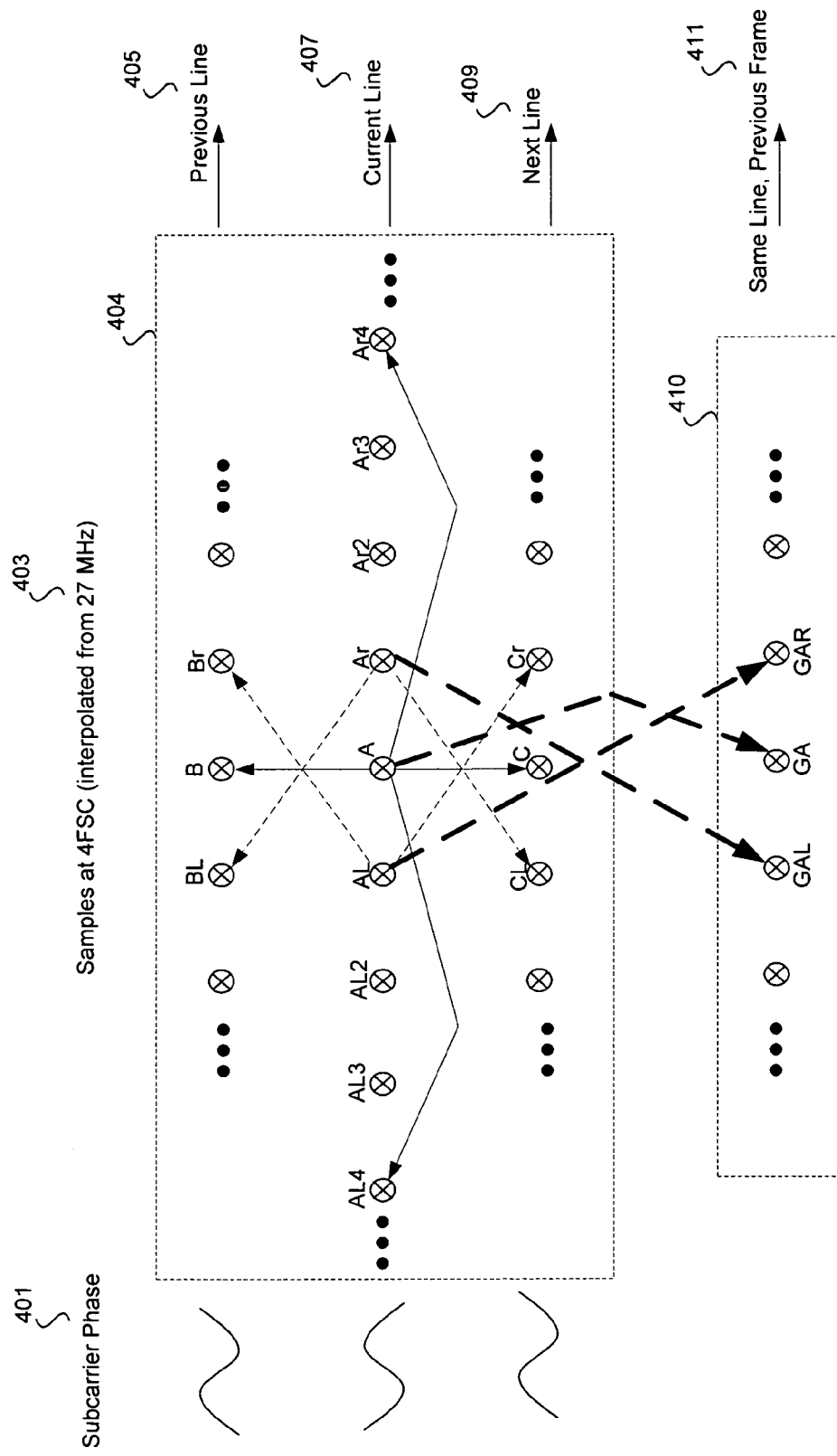
FIG. 3A is a diagram illustrating 2D and 3D comb filtering, in accordance with an embodiment of the invention.

FIG. 3A is a diagram illustrating 2D and 3D comb filtering, in accordance with an embodiment of the invention. Referring now to FIG. 3A, there is illustrated a sample of pixels from three adjacent lines in a current frame 404, a current line 407, a previous line 405, and a next line 409, as well as a same (current) line 411 but in a previous frame 410. The subcarrier phase 401 of the incoming composite video signal may be 3.58 MHz, and the incoming analog video signal may be digitized at 27 MHz, for example. Since 3.58 MHz and 27 MHz are not multiples of each other, there may not be an exact pixel sample every 3.58 MHz of digitized video signal that is aligned and in-phase. For example, it may be difficult to compare the peak of a sine wave on the current line 407 with the peak of a sine wave on the next line 409, since a pixel sample may not be obtained at the 27 MHz frequency. The composite video signal, therefore, may be run through a filter that interpolates pixel samples 403 at four times the frequency of the sub-carrier. For example, if the subcarrier frequency is at 3.58 MHz, the pixel samples 403 may be interpolated at 14.32 MHz.

Pixels A, B and C may be true sample pixels. However, all the remaining pixels to the left and to the right of the true sample pixels A, B and C, such as pixels BL, Br, AL, AL2, AL3, AL4, Ar, Ar2, Ar3, Ar4, CL, and Cr, may be interpolated pixels. In a given line, each pixel may be shifted by a quarter subcarrier cycle from the adjacent pixel. In addition, each line may be 180 degree phase-shifted from its adjacent line. For example, pixel A and interpolated pixel AL4, to the left of pixel A in the current line 407, may be in phase with each other, whereas pixel A and interpolated pixel AL may be quarter cycle phase-shifted from each other. Similarly, interpolated pixel Ar may be a quarter cycle phase-shifted to the right of pixel A, and interpolated pixel Ar4 may be in phase with pixel A. Since the current line 407 may be 180 degrees phase-shifted from either the previous line 405 or the next line 409, pixel A may also be phase-shifted 180 degrees from either pixel B in the previous line 405 or pixel C in the next line 409.

In an embodiment of the invention, the amount of frequency content movement may be approximated between pixels within a given pixel line, between pixel lines within the same video frame, and between similar pixel lines in adjacent frames, and the corresponding combing method may be applied with a minimum bandwidth loss. For example, if vertical combing is applied with regard to pixel A, then pixel A may be subtracted from pixel B resulting in two times the luma, or pixel A may be subtracted from pixel C to obtain two times the luma, or pixel A may be subtracted from the average of B and C to obtain two times the luma. The same process may be performed between pixel A and interpolated pixel AL2, since they are out of phase The phase difference between pixels A and B is the same as between pixel A and interpolated pixel AL2, i.e. 180 degrees. In order to determine whether vertical combing may be applied without a significant bandwidth loss, pixels in the current line 407 and the previous line 405 may be compared. For example, interpolated pixel AL in the current line 407 may be compared with interpolated pixel Br in the previous line 405, where interpolated pixel AL is in phase with interpolated pixel Br since there is 360 degree phase difference between them. Similarly, interpolated pixel Ar may be compared with interpolated pixel BL, where interpolated pixel Ar is in phase with interpolated pixel BL since there is 360 degrees phase difference between them as well.

If these two comparisons indicate a big difference, this may be indicative of significant vertical frequency content going from B to A. If the difference between the interpolated pixels in the two comparisons is small, then this may indicate that there is not a lot of vertical frequency content. Accordingly, vertical combing may be applied between the current line 407 and the previous line 405 without a significant bandwidth loss. Similarly, comparisons between the interpolated pixels AL and Cr, and Ar and CL may be indicative of whether vertical combing may be applied between the current line 407 and the next line 409, without a significant bandwidth loss. Depending on the composite video signal, there may be no frequency content between pixel B and pixel A, which indicates that the current line and the previous line are identical lines. A large frequency content between pixel A and pixel C may indicate that a vertical transition has happened immediately after the current line. Conversely, there may be a lot of frequency content between pixel B and pixel A, and no frequency content between pixel A and pixel C. This may be characterized by the fact that the current line and the next line are very similar, but the current line and the previous line are different. In this case, vertical combing may be performed between the current line and the next line.

A final comparison may be performed between pixels A, B and C, in order to determine whether vertical combing may be applied with a minimum bandwidth loss. If pixels A, B and C are, for example, all in phase with each other, this may be indicative that there is no chroma component and pixels A, B and C contain only luma components, for example, if the video signal comprises a white character or a black background. In this case, since there is no frequency content between the current line 407, the previous line 405 and the next line 409, vertical combing may be applied without a significant loss in bandwidth.

With regard to horizontal combing, or notch filtering, pixel A may be compared with interpolated pixels AL4 and Ar4 in the current line 407, which are in phase with pixel A. This may provide an indication of the horizontal frequency content in the current line 407. If pixel A is very different from either of interpolated pixels AL4 or Ar4, it may indicate that there is significant frequency content in the current line 407. If, on the other hand, the pixels are very similar, it may indicate that there is less frequency content and horizontal combing may be applied. In an embodiment of the present invention, a wide band pass filter may be utilized in order to horizontally filter a composite signal and eliminate the luma component that is not near the chroma subcarrier frequency, for example, a 3.58 MHz subcarrier frequency.

In yet a different embodiment of the invention, 3D combing may also be implemented taking into consideration temporal signal comparison for purposes of applying temporal combing with a minimum temporal bandwidth loss. Referring again to FIG. 3A, pixels in the same line/previous frame 411 may be considered. For example, GA may be an actual pixel similar to pixel A, but it may be phase-shifted 180 degrees from pixel A in the previous frame. Pixel GA may be the same pixel as pixel A in the previous frame, interpolated pixel GAL may be one quarter of a 3.58 MHz subcarrier frequency off to the left in the previous frame, and interpolated pixel GAR may be one-quarter of a subcarrier cycle off to the right on the same line in the previous frame. Since pixels Ar and GAL are phase-shifted at 360 degrees and are in phase with each other, they may be compared for temporal frequency content.

Similarly, pixels AL and GAR may also be compared for temporal frequency content. If these two comparisons indicate that the pixels are similar, then this may indicate that pixel A is very similar to pixel GA and that there is no temporal frequency content movement from the previous frame. In this case, temporal combing may be performed since there will be no significant temporal bandwidth loss. If, on the other hand, the two comparisons show a large difference, then it may be indicative of a significant temporal frequency content between the current and the previous frame, and temporal combing, therefore, may not be desirable since it may involve temporal bandwidth loss. A comparison between pixel A and pixel GA may be useful in instance where there is a pixel that bears no color, for example, a black and/or a white pixel. Such pixels are characterized only by a luma component and, therefore, have no phase difference between each other. In this case, temporal combing may be applied without any resulting temporal bandwidth loss.

A 3D comb filter in accordance with an embodiment of the invention, may be implemented by first horizontally combing a composite video signal. The horizontal combing may be accomplished by running the composite video signal through a very wide band pass filter, for example, so that it may pre-filter the very low frequency luma component within the composite video signal. In this way, if there is very coarse (VC), slow moving luma changes, such VC luma may be eliminated and not be considered in subsequent vertical and/or temporal combing processes. If a subcarrier frequency of 3.58 MHz is utilized, chroma components may be centered around 3.58 MHz, or approximately between 2 and 5 MHz. In other words, any frequency content below 2 MHz may be considered a luma component and may be filtered out by the band pass filter. By performing the corresponding comparisons between pixels, as outlined above, it may be determined whether vertical combing and/or temporal combing may be utilized without significant bandwidth loss. For example, horizontal and vertical combing, or 2D combing, may be the only useful combing methods in one embodiment of the present invention. In another embodiment of the present invention, horizontal, vertical and temporal combing, or 3D combing, may be applied without significant bandwidth loss. A final combing decision as to a specific composite signal may include a blend of 2D and 3D combing. In this case, a certain percentage of a pixel may be only vertically or horizontally combed, and the remaining pixel may be combed vertically and temporally.

Figure 3B:
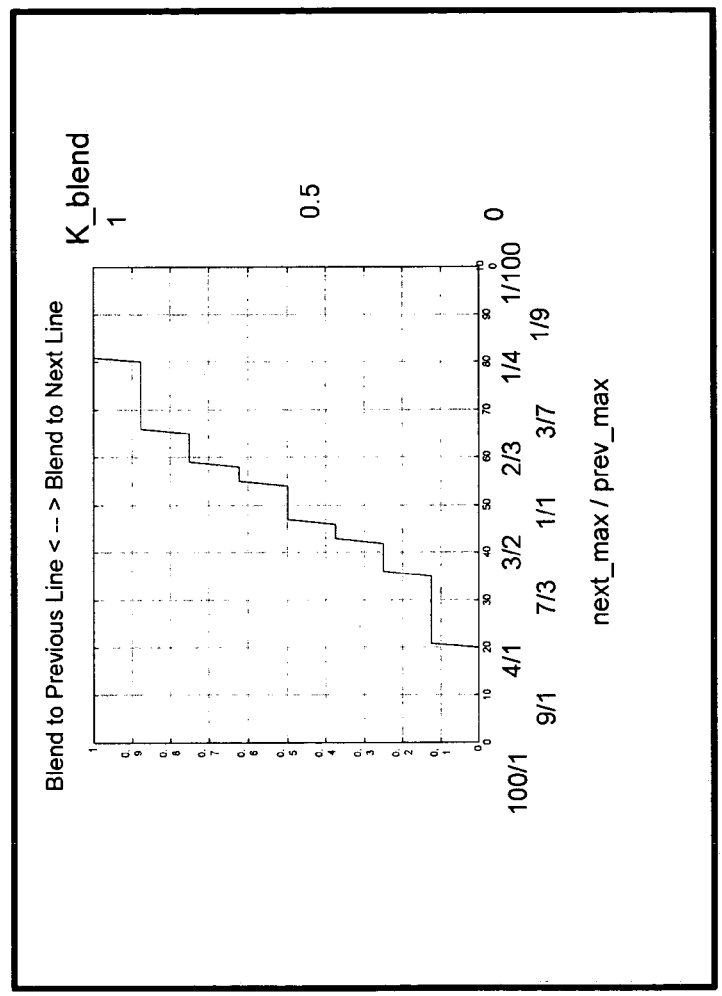
FIG. 3B is a diagram of a blending decision factor related to blending to previous line versus blending to next line, in accordance with an embodiment of the invention.

FIG. 3B is a diagram 330 of a blending decision factor related to blending to previous line versus blending to next line, in accordance with an embodiment of the invention. Referring to FIG. 3B, a decision as to the quality of combing with the previous line versus combing with the next line may be accomplished by calculating a ratio k_blend of the previous line compares to the next line compares, for example. The k_blend ratio may be calculated using compares and constant multiplies so that it is a value between zero and one. This is a non-linear ratio between the comparison to the previous line and the comparison to the next line. A constant value in the k_blend calculation may be utilized to bias strongly against luma only comparisons. In the case of low chroma it may not be desirable to falsely pass the luma only condition. K_blend may be calculated as a function of next_max and prev_max. Next_max may be a measure of the bandwidth difference between a current line and a next line, for example. Prev_max may be a measure of the bandwidth difference between a current line and a previous line, for example. K_blend may be a function of the ratio of prev_max to next_max. The larger the ratio, the smaller the value of k_blend. The previous and next lines may be alpha blended together to comb with the current line. Conceptually the blend tends toward the smaller of prev and next. The blend will skew toward next_line when Next_max/Prev_max is small, and skew toward prev_line when Prev_max/Next_max is small.

In one aspect of the invention, a different blending decision factor may be determined. A notch filter may be utilized for horizontal combing. In order to obtain a better combing decision, a notch filter may be compared to a vertical comb filter by calculating a ratio of the quality of the vertical comb using the previous line, to the quality of the horizontal comb. A different ratio my be related to the quality of the vertical comb using the next line, to the quality of the horizontal comb.

Figure 3C:
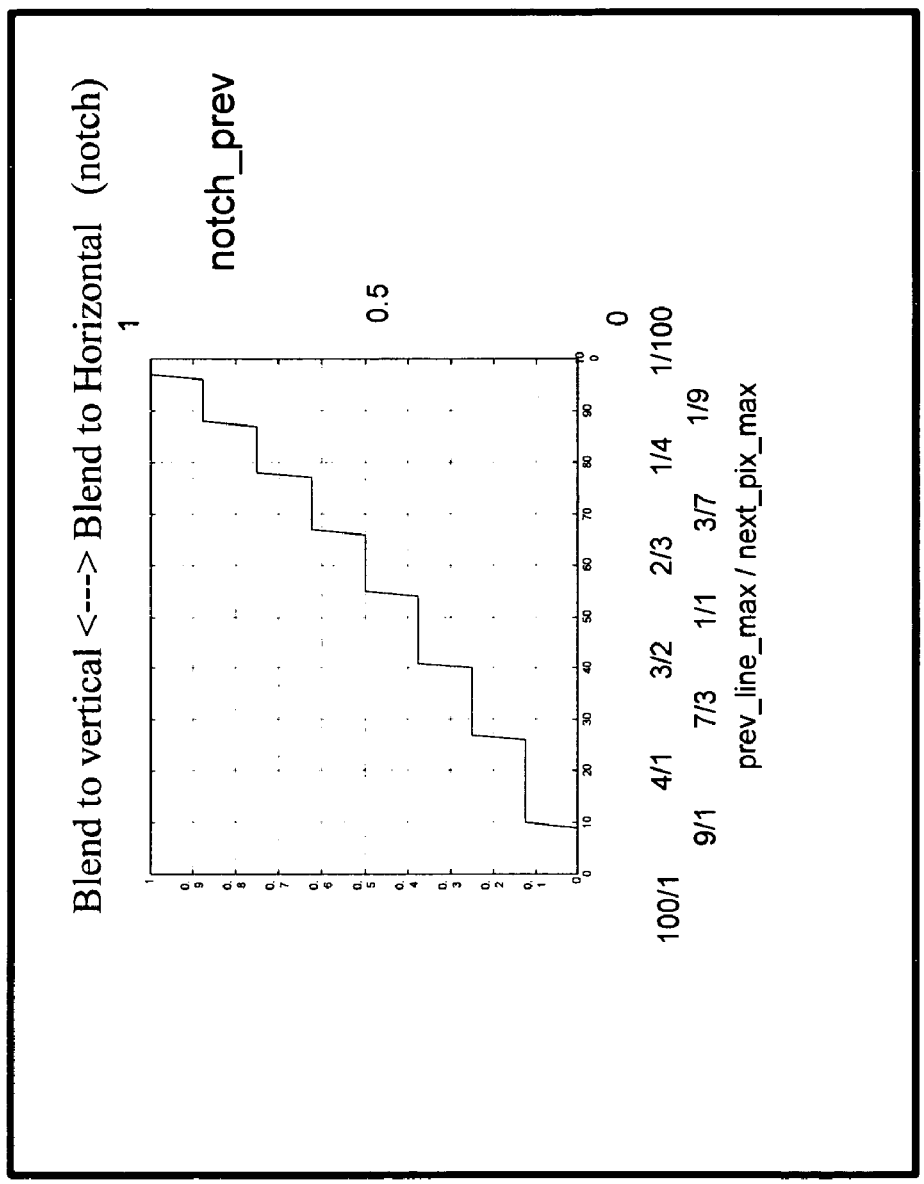
FIG. 3C is a diagram of a blending decision factor related to blending vertically versus blending horizontally, in accordance with an embodiment of the invention.

FIG. 3C is a diagram 340 of a blending decision factor related to blending vertically versus blending horizontally, in accordance with an embodiment of the invention. Referring now to FIG. 3C, a blending decision factor may be determined from a ratio notch_prev, where notch_prev may indicate whether to blend vertically and/or horizontally between a current line and a previous line. Notch_prev may be determined as a function of prev_line_max and next_pix_max. Prev_line_max may be a measure of the bandwidth difference between a current line and a previous line. Next_pix_max may be a measure of the bandwidth difference between two sets of in-phase pixels in a current line. A higher notch_prev ratio may indicate a preference towards notching versus vertical blending.

A notch_next ratio may be determined in a similar way, where notch_next may indicate whether to blend vertically and/or horizontally between a current line and a next line. A final notch ratio may be determined as a function of the notch_prev and notch_next ratios in order to obtain a blending decision factor related to blending vertically versus blending horizontally. For example, a final notch value for each pixel may be determined by the following equation:

notch=notch_next.* k_blend+notch_prev.*(1-k_blend);

Conceptually, if the k_blend combing decision tends towards combing with the top line, the top line may be given more weight in judging the relative goodness of notching. If the k_blend combing decision tends towards combing with the bottom line, the bottom line may be given more weight in judging the relative goodness of notching.

In cases of significantly more luma than chroma at a given point in a composite signal, a notch filter may be gradually disabled. This is because the notch filter tends to put most of the signal that is left, after an initial high pass filter, into chroma. If the combed signal is mostly luma, it may be inefficient to allow it to be put into chroma.

Figure 3D:
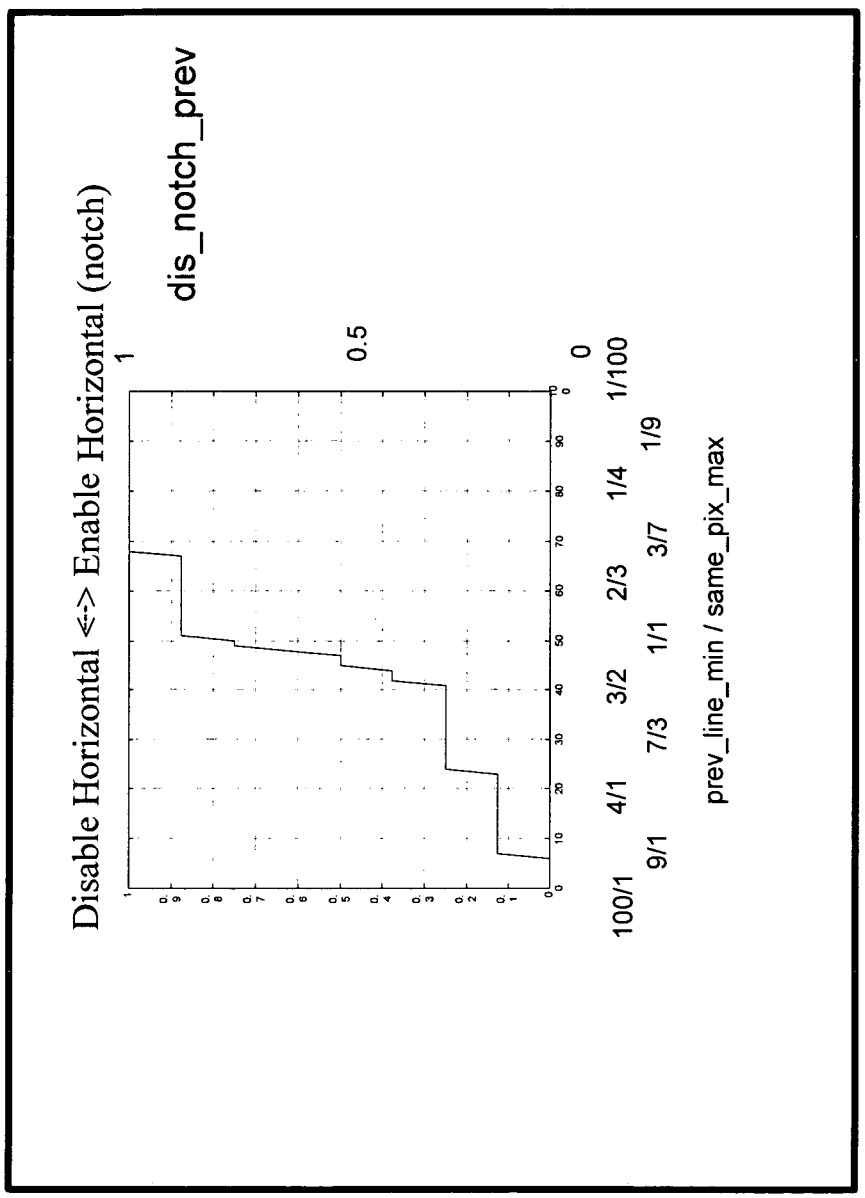
FIG. 3D is a diagram of a blending decision factor related to enabling horizontal combing versus disabling horizontal combing, in accordance with an embodiment of the invention.

FIG. 3D is a diagram 350 of a blending decision factor related to enabling horizontal combing versus disabling horizontal combing, in accordance with an embodiment of the invention. Referring to FIG. 3D, a disable notch signal dis_notch_prev may be generated by a ratio of the previous/next line compare with the previous/next line luma only compare. If the point is mostly luma, the luma only compare will be much smaller than the in phase compare. Dis_notch_prev may be determined as a ratio between prev_line_min and same_pix_max, for example. Prev_line_min may be associated with a bandwidth difference between in-phase pixels in a current and previous lines. Same_pix_max may be associated with a bandwidth difference between out-of-phase pixels in a current, previous and next line.

Similarly, a dis_notch_next may be determined as a ratio between next_line_min and same_pix_max, for example, where next_line_min may be associated with a bandwidth difference between in-phase pixels in a current and next lines. Dis_notch_next and dis_notch_prev, therefore, may be determined by the ratio of the previous or next line luma and chroma compare to the previous or next line luma only compare.

If the amplitude of the band passed video signal is very small relative to the difference to the closest matching adjacent line, then the disable notch parameter is not an accurate measure. In this case, the disable notch may not be used. A disable vertical notch, dis_vert_notch, parameter may be utilized.

Figure 3E:
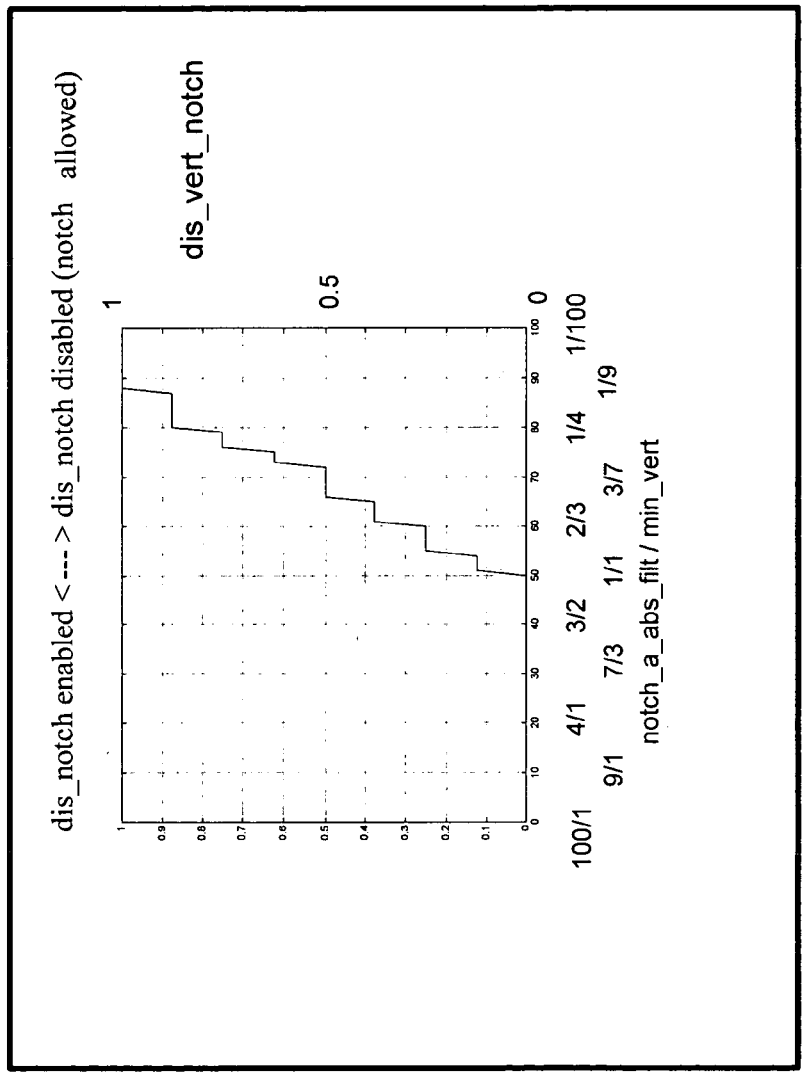
FIG. 3E is a diagram of a blending decision factor related to horizontal combing, in accordance with an embodiment of the invention.

FIG. 3E is a diagram 360 of a blending decision factor related to horizontal combing, in accordance with an embodiment of the invention. Referring now to FIG. 3E, a dis_vert_notch may be calculated as a ratio of notch_a_abs_filt and min_vert, for example. Notch_a_abs_filt may measure the absolute value of an amplitude of a signal on a current line. Min_vert may be associated with the minimum of bandwidth difference between current line and a previous line, and/or a current line and a next line.

Conceptually, if dis_vert_notch is 0, then it has no effect. Dis_notch is allowed to mask or not mask notch. If dis_vert_notch is 1, then dis_notch has no effect and dis_notch may be disabled. In this case notch is never masked, and the decision to notch or vertically comb is utilized without modification. A weighted disable notch ratio dis_notch may be calculated as:

dis_notch=max(dis_notch, dis_vert_notch)

The calculated notch signal may be cubed and disable notch may be squared. This may cause the roll off due to notch to be accelerated. Then disable notch may be used to calculate a final value for notching. Notch may also be low pass filtered and may be generated according to the following equation:

notch=dis_notch^2*notch^3

Referring again to FIG. 3A, since points A and GA are 180 degrees out of phase with each other, in chroma, they may not be directly compared, except in the case where there is no chroma at this point. Points A, B, C and G are actual sampled points sampled at 27 MHz. All the other points may be interpolated to give 4FSC sample points. Points AL and AR may be one quarter of a subcarrier cycle away from point A. Points GAL and GAR may be one quarter of a subcarrier cycle away from point GA. Since points A and GA may be 180 degrees out of phase with each other, AL may be in phase with GAR and AR may be in phase with GAL. Since they are in phase they can be directly compared. There may be some spatial difference between these points and points A and GA. But, by shifting the samples a quarter of a cycle in each direction, the spatial difference may be minimized. a measure of the temporal bandwidth (motion). In order to calculate a measure of temporal bandwidth, in the case where there is no chroma at this point, points G may be compared directly with point A. The actual measure of the temporal bandwidth may be calculated by comparing the temporal bandwidth in the case with chroma and the case of luma only. The results may be low pass filtered.

An estimate may be obtained of the quality of the 2D comb. This may be calculated based on the difference between the current pixel and the pixel that the 2D combing logic decided to comb with. First the vertical difference may be calculated according to the ratio of k_blend. Next this may be blended with the horizontal quality according to the ratio of notch. The qualities of the vertical blends, previous and next, may be weighted together to give an overall vertical quality measure. This vertical quality measure may then be weighted together with the horizontal quality, giving an overall quality measure of the 2D comb.

Figure 4A:
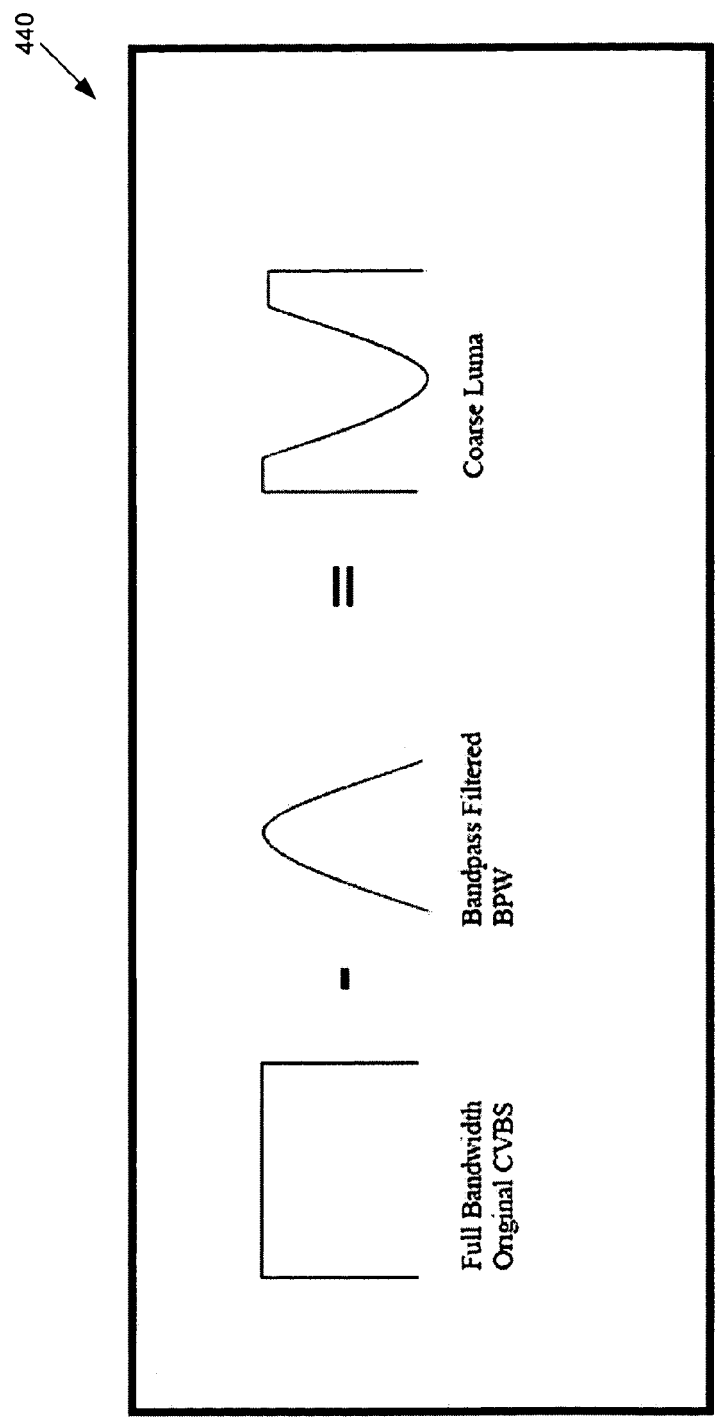
FIG. 4A is a diagram of coarse luma determination, in accordance with an embodiment of the invention.

FIG. 4A is a diagram 440 of coarse luma determination, in accordance with an embodiment of the present invention. A coarse estimate of luma may be obtained for both the current frame and the previous frame as illustrated in FIG. 4A. This may be accomplished by subtracting the band passed signal from the composite signal. In this way, the part of luma that is clearly outside the chroma bandwidth range may be obtained.

The coarse estimate of luma may be used to mask off the 3D combing decision. If the luma part of the composite signal does not match between the two frames, it may be determined that there is motion. This may be true even if the band passed part of the signal matches perfectly.

Figure 4B:
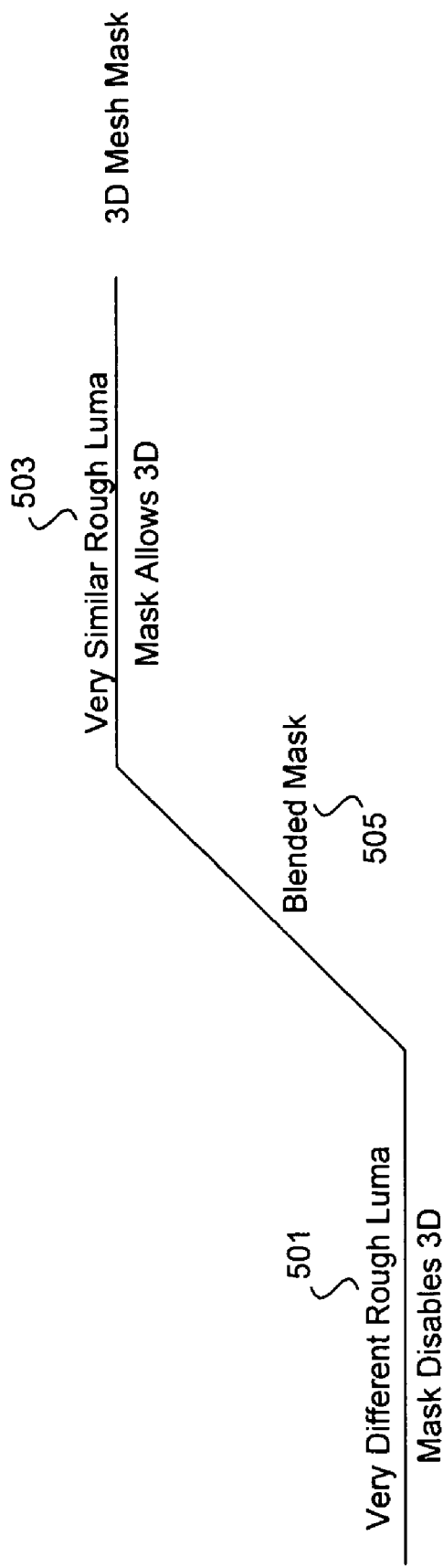
FIG. 4B is a diagram of a 3D comb filter mesh mask, in accordance with an embodiment of the invention.
Figure 5:
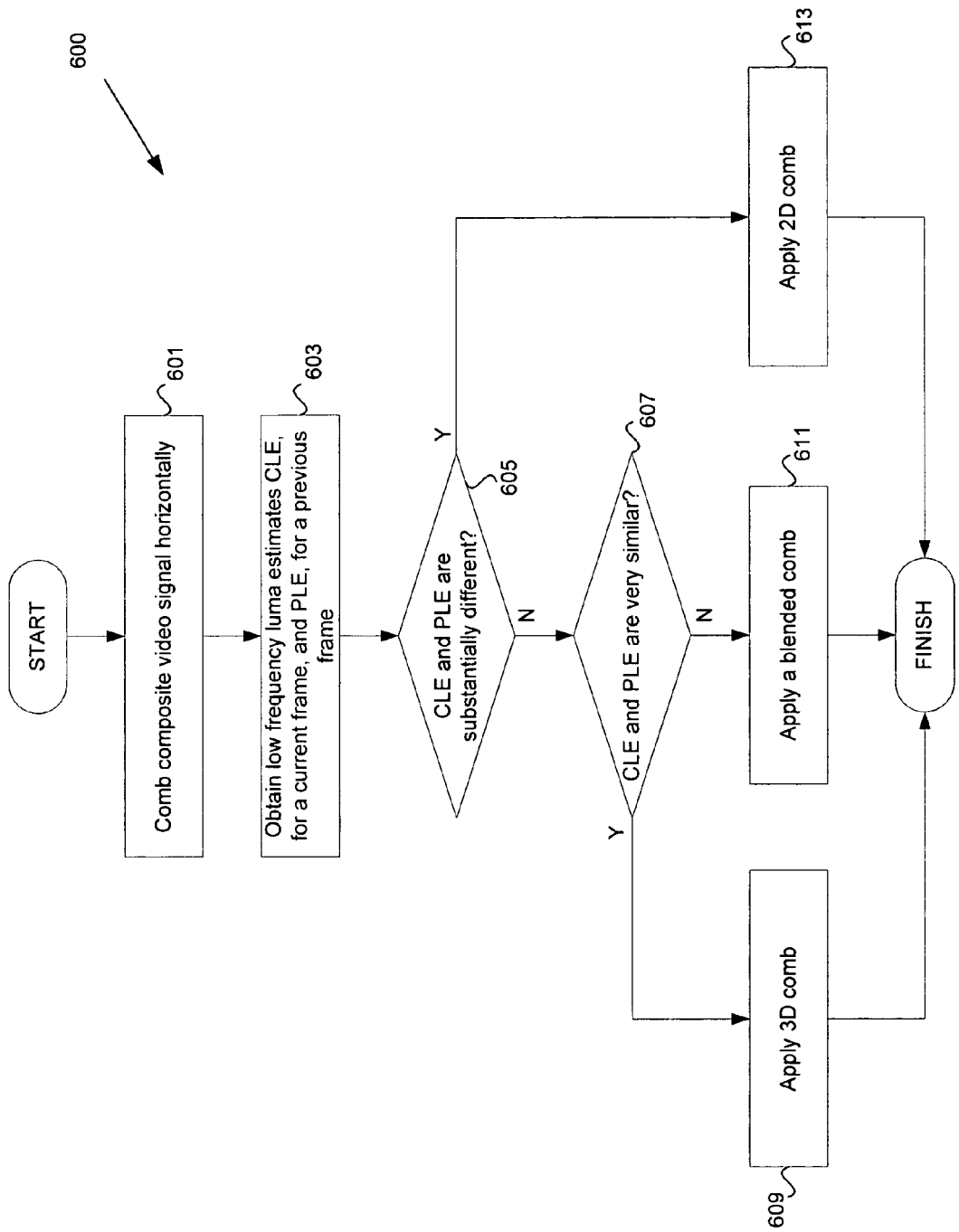
FIG. 5 is a flow diagram of a method for 3D comb filter mask determination, in accordance with an embodiment of the invention.

FIG. 4B is a diagram of a 3D comb filter mesh mask, in accordance with an embodiment of the present invention. A mesh mask may be utilized in order to ascertain whether 3D combing may be utilized for a specific composite signal. Referring now to FIGS. 4A, 4B and 5, the output of the wide band pass filter may be subtracted from the original composite signal input, and the low frequency luma component may be obtained, or a rough estimate of the low frequency luma. Such estimate of low frequency luma may be calculated for a current frame and for a previous frame, for example. The two resulting rough values of luma may then be compared on a pixel-by-pixel basis. If the two rough luma values are very different, then 3D combing may be disabled by the mask, at 501, and 2D combing may be the only method that may be applied to separate luma and chroma components in the composite video signal. If the two rough luma values are very similar, then 3D combing may be allowed by the mesh mask, at 503, and the composite video signal may be combed horizontally, vertically and temporally. For any value of the luma difference, which is between 501 and 503, a blended mask 505 may be applied to separate the luma and chroma components of the composite video signal.

In another embodiment of the present invention, the blended mask 505 may be applied in cases where the two rough luma values are not very different. A blended mask may indicate, for example, that a certain percentage of the 3D combing, for example 30%, may be "trusted" and the remaining percent, for example the remaining 70%, may be combed via 2D combing. The blended mask may re-adjust the ratio between 3D combing and 2D combing for a given pixel depending on how close the two rough luma values are to being very different and how close they are to being very similar.

Figure 4C:
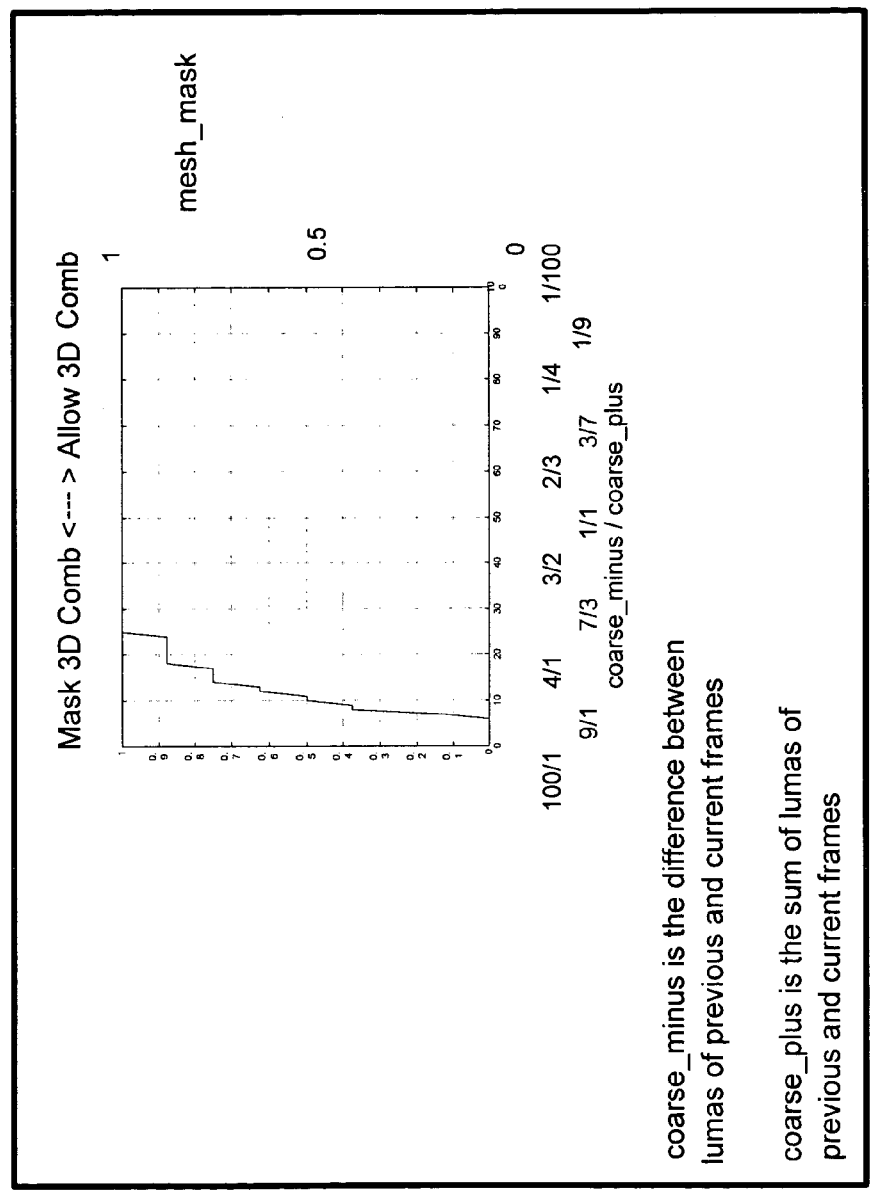
FIG. 4C is a diagram of a 3D comb filter mesh mask, in accordance with an embodiment of the invention.

FIG. 4C is a diagram 450 of a 3D comb filter mesh mask, in accordance with an embodiment of the invention. Mesh_mask may be determined as a ratio between coarse_minus and coarse_plus, for example. Coarse_minus may be the difference between lumas of previous and current frames. Coarse_plus may be the sum of lumas of previous and current frames. Mesh_mask ratio may tend towards masking 3D combing if the luma between the two consecutive frames is very different. It may also tend towards allowing 3D combing if the luma between the two consecutive frames is very similar.

Figure 4D:
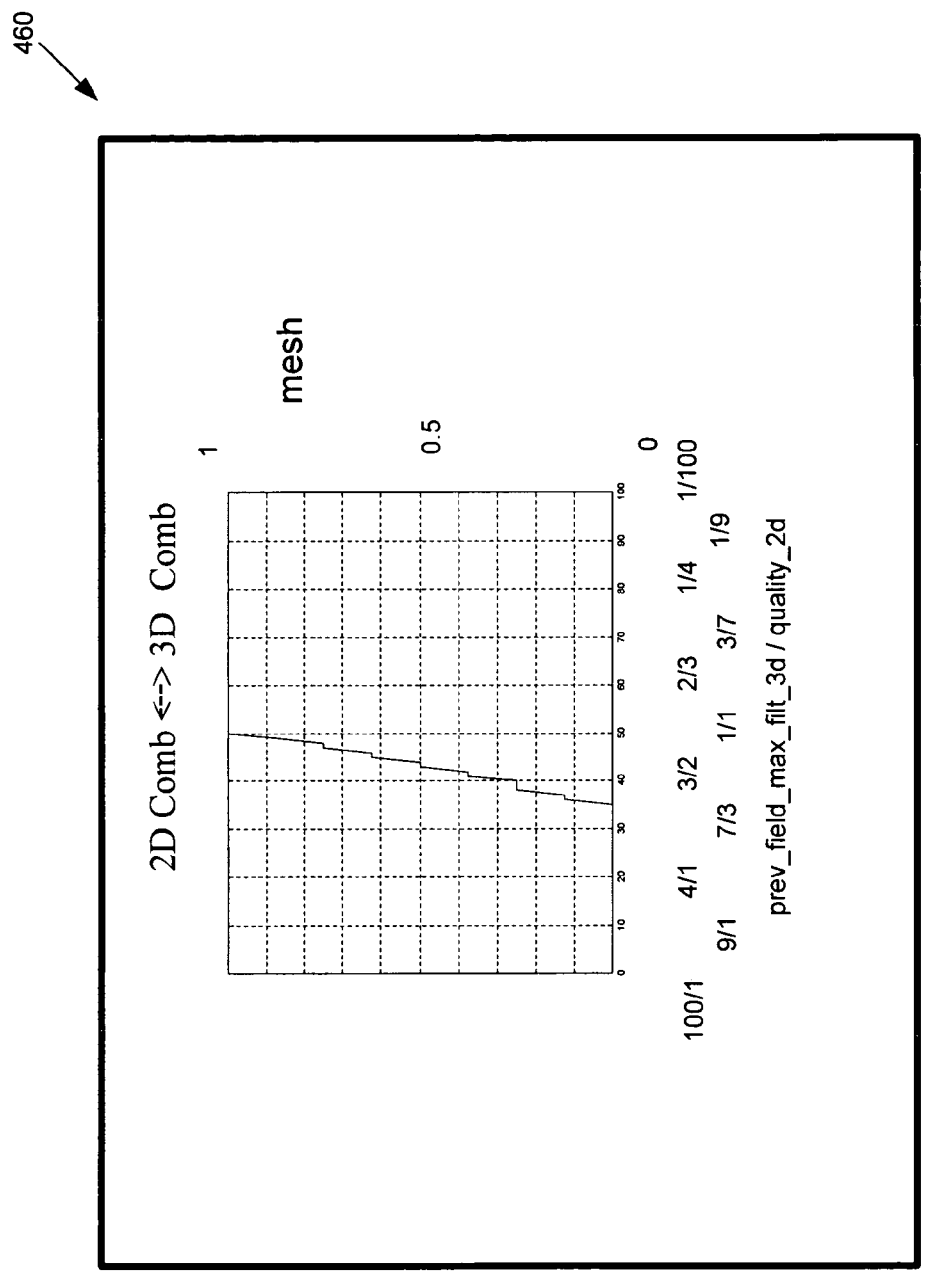
FIG. 4D is a diagram of a 3D comb filter mesh, in accordance with an embodiment of the invention.

FIG. 4D is a diagram 460 of a 3D comb filter mesh, in accordance with an embodiment of the invention. Referring to FIG. 4D, a mesh ratio may be determined as a measure of combing quality of 2D combing versus 3D combing. Mesh may be determined as a ratio between prev_field_max_filt_3d and quality_2d. Prev_field_max_filt_3d may be a measure of bandwidth difference between a pixel in a current frame and the same pixel in a previous frame. Quality_2d may be a measure of quality of 2D combing, as measured, for example, by various ratios as specified above in this application.

To determine the blending of 3D combing versus 2D combing the quality of the 2D comb decision is compared with the quality of 3D combing. The ratio of these two numbers determines the blend between 2D and 3D combing. Conceptually, mesh may tend towards the smaller of quality_2d (error term of 2D comb) and prev_field_max_filt_3d (error term of 3D comb). The larger prev_field_max_filt_3d is (or the worse the quality of the 3D comb), the more mesh may tend to 2D comb. The larger quality_2d (or the worse the quality of the 2D comb), the more mesh may tend to 3D comb.

A final blend of 3D combing and 2D combing may be based on the product of the mesh and the mesh mask. The following equation may be utilized:

$$mesh = mesh * mesh\_mask$$

The final mesh value may be used to alpha blend the chroma and luma between 2D and 3D combing.

FIG. 5 is a flow diagram of an exemplary method 600 for 3D comb filter mask determination, in accordance with an embodiment of the present invention. At 601, a composite video signal may be combed horizontally. For example, a composite video signal may be notch filtered by utilizing a wide band pass filter. At 603, estimates of a low frequency luma component for a current frame, CLE, and a low frequency luma component for a previous frame, PLE, may be obtained. For example, in order to estimate CLE and PLE, the output of the wide band pass filter may be subtracted from the original composite video signal. At 605, it may be determined whether CLE and PLE are substantially different. If CLE and PLE are substantially different, at 613, 3D combing may be disabled and only 2D combing may be utilized with the original composite video signal. If the CLE and PLE are not substantially different, at 607, it may be determined whether CLE and PLE are very similar. If CLE and PLE are very similar, at 609, 3D combing may be applied to the original composite video signal. If CLE and PLE are not very similar, a blended comb approach may be taken, at 611. In this way, a certain percentage of vertical and temporal combing may be utilized with the original composite video signal.

Figure 6:
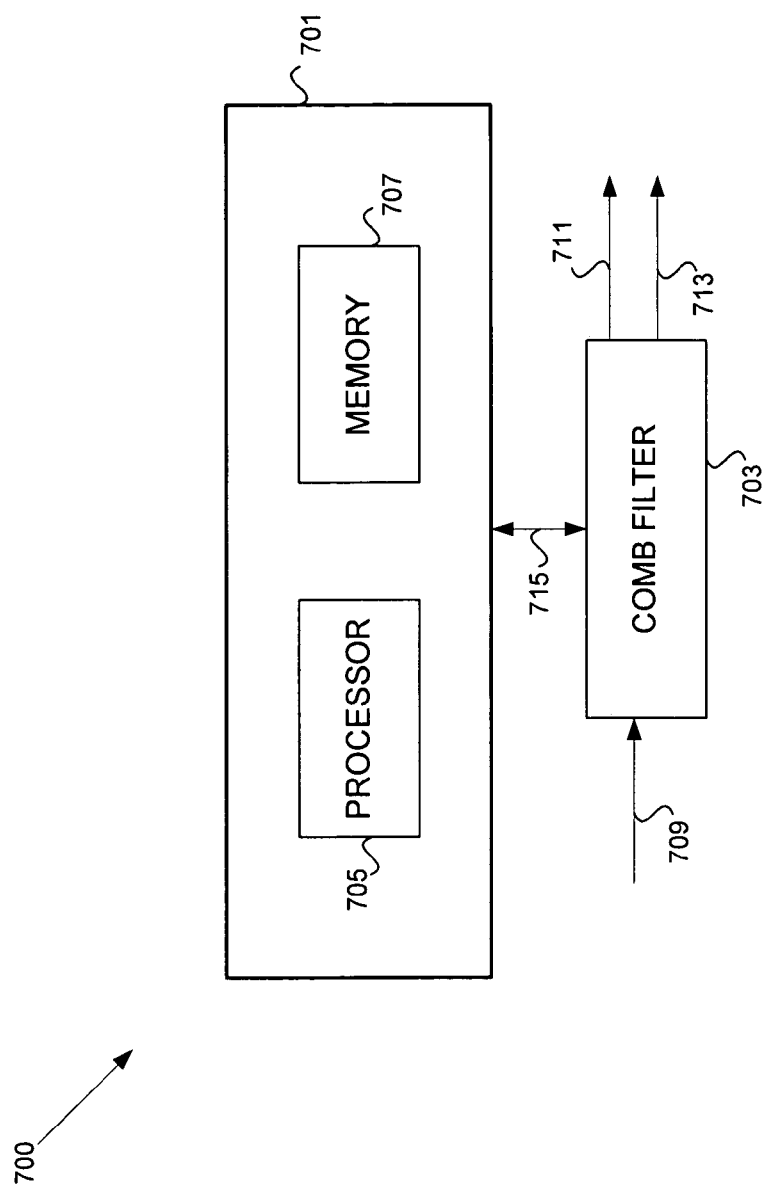
FIG. 6 is a block diagram of an exemplary system that may be used in connection with 3D combing, in accordance with an embodiment of the invention.

FIG. 6 is a block diagram of an exemplary system that may be used in connection with 3D combing, in accordance with an embodiment of the present invention. Referring to FIG. 6, the system 700 may comprise a host 701 and a comb filter 703. The host 701 may comprise a processor 705 and a host memory 707. The host 701 may be communicatively coupled to the comb filter 703 via an interface bus 715. In another embodiment of the present invention, the comb filter 703 may be a part of the host 701.

In operation, the comb filter 703 may comprise suitable logic, circuitry and/or code and may be adapted to receive a video signal 709, separate the chroma and luma components, and then output the chroma component 711 and the luma component 713 separately. The processor 705 may generate a plurality of interpolated pixels for corresponding video samples for a first video frame in the video signal 709. The processor 705 may then determine one or more directions of least bandwidth among the video samples and the interpolated pixels, and it may comb in the determined directions of least bandwidth. Interpolated pixels for corresponding video samples may be generated by the processor 705 in a first pixel line of the first video frame. The plurality of interpolated pixels in the first pixel line may be shifted, so that each of the plurality of interpolated pixels in the first pixel line is one quarter cycle phase-shifted from a corresponding adjacent pixel in the first pixel line. The comb filter 703 may comb horizontally, if the determined direction of least bandwidth is among in-phase pixels in the first pixel line.

A plurality of interpolated pixels for corresponding video samples in a second pixel line of the first video frame may be generated by the processor 705, so that each of the plurality of interpolated pixels in the second line is one half cycle phase-shifted from a corresponding pixel in the first pixel line. The comb filter 703 may comb vertically, if the determined direction of least bandwidth is among corresponding in-phase pixels in the first pixel line and in the second pixel line. The comb filter 703 may also comb vertically if the determined direction of least bandwidth is among corresponding one-half cycle phase-shifted video samples in the first pixel line and in the second pixel line for a luma-only video signal. The processor 705 may generate a plurality of interpolated pixels for corresponding video samples in a first pixel line of a second video frame, so that each of the plurality of interpolated pixels in the first pixel line of the second video frame is one half cycle phase-shifted from a corresponding pixel in the first pixel line of the first video frame.

The comb filter 703 may comb temporally, if the determined direction of least bandwidth is among corresponding in-phase pixels in the first pixel line of the first video frame and in the first pixel line of the second video frame. The comb filter 703 may also comb temporally, if the determined direction of least bandwidth is among corresponding one-half cycle phase-shifted video samples in the first pixel line of the first video frame and in the first pixel line of the second video frame for a luma-only video signal. The comb filter 703 may comb in a horizontal direction and in a vertical direction for the first video frame. The processor 705 may blend the combing in a horizontal direction and a vertical direction, and combing in a temporal direction for the first video frame.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for separating luma and chroma components in a composite video signal, the method comprising:
   generating a plurality of interpolated pixels for corresponding video samples for a first video frame;
   determining at least one direction of least bandwidth among the video samples and the interpolated pixels; and
   blending combing according to the determined direction of least bandwidth.

2. The method of claim 1, comprising generating a plurality of interpolated pixels for corresponding video samples in a first pixel line of the first video frame.

3. The method of claim 2, comprising generating the plurality of interpolated pixels in the first pixel line, so that each of the plurality of interpolated pixels in the first pixel line is one quarter cycle phase-shifted from a corresponding adjacent pixel in the first pixel line.

4. The method of claim 3, comprising combing horizontally, if the determined direction of least bandwidth is among in-phase pixels in the first pixel line.

5. The method of claim 2, comprising generating a plurality of interpolated pixels for corresponding video samples in a second pixel line of the first video frame, so that each of the plurality of interpolated pixels in the second line is one half cycle phase-shifted from a corresponding pixel in the first pixel line.

6. The method of claim 5, comprising combing vertically, if the determined direction of least bandwidth is among corresponding in-phase pixels in the first pixel line and in the second pixel line.

7. The method of claim 5, comprising combing vertically, if the determined direction of least bandwidth is among corresponding one-half cycle phase-shifted video samples in the first pixel line and in the second pixel line for a luma-only video signal.

8. The method of claim 2, comprising generating a plurality of interpolated pixels for corresponding video samples in a first pixel line of a second video frame, so that each of the plurality of interpolated pixels in the first pixel line of the second video frame is one half cycle phase-shifted from a corresponding pixel in the first pixel line of the first video frame.

9. The method of claim 8, comprising combing temporally, if the determined direction of least bandwidth is among corresponding in-phase pixels in the first pixel line of the first video frame and in the first pixel line of the second video frame.

10. The method of claim 8, comprising combing temporally, if the determined direction of least bandwidth is among corresponding one-half cycle phase-shifted video samples in the first pixel line of the first video frame and in the first pixel line of the second video frame for a luma-only video signal.

11. The method of claim 1, comprising combing in a horizontal direction and a vertical direction for the first video frame.

12. The method of claim 11, comprising blending the combing in the horizontal direction and the vertical direction and combing in a temporal direction for the first video frame.

13. A machine-readable storage having stored thereon, a computer program having at least one code section for separating luma and chroma components in a composite video signal, the at least one code section being executable by a machine for causing the machine to perform steps comprising:
   generating a plurality of interpolated pixels for corresponding video samples for a first video frame;
   determining at least one direction of least bandwidth among the video samples and the interpolated pixels; and
   blending combing according to the determined direction of least bandwidth.

14. The machine-readable storage of claim 13, comprising code for generating a plurality of interpolated pixels for corresponding video samples in a first pixel line of the first video frame.

15. The machine-readable storage of claim 14, comprising code for generating the plurality of interpolated pixels in the first pixel line, so that each of the plurality of interpolated pixels in the first pixel line is one quarter cycle phase-shifted from a corresponding adjacent pixel in the first pixel line.

16. The machine-readable storage of claim 15, comprising code for combing horizontally, if the determined direction of least bandwidth is among in-phase pixels in the first pixel line.

17. The machine-readable storage of claim 14, comprising code for generating a plurality of interpolated pixels for corresponding video samples in a second pixel line of the first video frame, so that each of the plurality of interpolated pixels in the second line is one half cycle phase-shifted from a corresponding pixel in the first pixel line.

18. The machine-readable storage of claim 17, comprising code for combing vertically, if the determined direction of least bandwidth is among corresponding in-phase pixels in the first pixel line and in the second pixel line.

19. The machine-readable storage of claim 17, comprising code for combing vertically, if the determined direction of least bandwidth is among corresponding one-half cycle phase-shifted video samples in the first pixel line and in the second pixel line for a luma-only video signal.

20. The machine-readable storage of claim 14, comprising code for generating a plurality of interpolated pixels for corresponding video samples in a first pixel line of a second video frame, so that each of the plurality of interpolated pixels in the first pixel line of the second video frame is one half cycle phase-shifted from a corresponding pixel in the first pixel line of the first video frame.

21. The machine-readable storage of claim 20, comprising code for combing temporally, if the determined direction of least bandwidth is among corresponding in-phase pixels in the first pixel line of the first video frame and in the first pixel line of the second video frame.

22. The machine-readable storage of claim 20, comprising code for combing temporally, if the determined direction of least bandwidth is among corresponding one-half cycle phase-shifted video samples in the first pixel line of the first video frame and in the first pixel line of the second video frame for a luma-only video signal.

23. The machine-readable storage of claim 13, comprising code for combing in a horizontal direction and a vertical direction for the first video frame.

24. The machine-readable storage of claim 23, comprising code for blending the combing in the horizontal direction and the vertical direction and combing in a temporal direction for the first video frame.

25. A system for separating luma and chroma components in a composite video signal, the system comprising:
  at least one processor that generates a plurality of interpolated pixels for corresponding video samples for a first video frame;
  the at least one processor determines at least one direction of least bandwidth among the video samples and the interpolated pixels; and
  the at least one processor blends combing according to the determined direction of least bandwidth.

26. The system of claim 25, wherein the at least one processor generates a plurality of interpolated pixels for corresponding video samples in a first pixel line of the first video frame.

27. The system of claim 26, wherein the at least one processor generates the plurality of interpolated pixels in the first pixel line, so that each of the plurality of interpolated pixels in the first pixel line is one quarter cycle phase-shifted from a corresponding adjacent pixel in the first pixel line.

28. The system of claim 27, wherein the at least one processor combs horizontally, if the determined direction of least bandwidth is among in-phase pixels in the first pixel line.

29. The system of claim 26, wherein the at least one processor generates a plurality of interpolated pixels for corresponding video samples in a second pixel line of the first video frame, so that each of the plurality of interpolated pixels in the second line is one half cycle phase-shifted from a corresponding pixel in the first pixel line.

30. The system of claim 29, wherein the at least one processor combs vertically, if the determined direction of least bandwidth is among corresponding in-phase pixels in the first pixel line and in the second pixel line.

31. The system of claim 29, wherein the at least one processor combs vertically, if the determined direction of least bandwidth is among corresponding one-half cycle phase-shifted video samples in the first pixel line and in the second pixel line for a luma-only video signal.

32. The system of claim 26, wherein the at least one processor generates a plurality of interpolated pixels for corresponding video samples in a first pixel line of a second video frame, so that each of the plurality of interpolated pixels in the first pixel line of the second video frame is one half cycle phase-shifted from a corresponding pixel in the first pixel line of the first video frame.

33. The system of claim 32, wherein the at least one processor combs temporally, if the determined direction of least bandwidth is among corresponding in-phase pixels in the first pixel line of the first video frame and in the first pixel line of the second video frame.

34. The system of claim 32, wherein the at least one processor combs temporally, if the determined direction of least bandwidth is among corresponding one-half cycle phase-shifted video samples in the first pixel line of the first video frame and in the first pixel line of the second video frame for a luma-only video signal.

35. The system of claim 25, wherein the at least one processor combs in a horizontal direction and a vertical direction for the first video frame.

36. The system of claim 35, wherein the at least one processor blends the combing in the horizontal direction and the vertical direction and combing in a temporal direction for the first video frame.

37. A method for separating luma and chroma components in a composite video signal, the method comprising combing utilizing non-thresholded blending based on relative bandwidth in each of a plurality of three directions.

38. The method of claim 37, comprising combing utilizing non-thresholded blending based on relative bandwidth in a horizontal direction.

39. The method of claim 37, comprising combing utilizing non-thresholded blending based on relative bandwidth in a vertical direction.

40. The method of claim 37, comprising combing utilizing non-thresholded blending based on relative bandwidth in a temporal direction.

* * * * *